(12) United States Patent
Psaras et al.

(10) Patent No.: US 8,545,784 B2
(45) Date of Patent: Oct. 1, 2013

(54) METHOD FOR THE PRODUCTION OF RARE EARTH CONTAINING PHOSPHATES

(75) Inventors: Dimitrios Psaras, Bound Brook, NJ (US); Weidong Shi, Changzhou (CN); Ronghau Zhu, Jiangyin (CN); Rui Xiao, Jiangyin (CN)

(73) Assignee: Neo International Corp., Bridgetown (BB)

( * ) Notice: Subject to any disclaimer, the term of this patent is extended or adjusted under 35 U.S.C. 154(b) by 525 days.

(21) Appl. No.: 11/551,381

(22) Filed: Oct. 20, 2006

(65) Prior Publication Data

US 2008/0095685 A1    Apr. 24, 2008

(51) Int. Cl.
*C01F 17/00*    (2006.01)

(52) U.S. Cl.
USPC ........... 423/263; 423/299; 423/304; 423/305; 423/306

(58) Field of Classification Search
USPC .......... 423/263, 299, 304–306; 252/301.4 R, 252/301.4 P
IPC ...................................................... C01F 17/00
See application file for complete search history.

(56) References Cited

U.S. PATENT DOCUMENTS

| | | | |
|---|---|---|---|
| 3,104,226 A | 9/1963 | Struck | |
| 3,507,804 A | 4/1970 | Ropp | |
| 3,752,878 A | 8/1973 | Kehl et al. | |
| 5,091,110 A * | 2/1992 | Fan et al. | ................. 252/301.4 P |
| 5,132,042 A | 7/1992 | Chau et al. | |
| 5,217,647 A * | 6/1993 | Tono et al. | ............. 252/301.4 S |
| 5,340,556 A * | 8/1994 | Collin et al. | .................. 423/263 |
| 5,470,503 A | 11/1995 | Braconnier | |
| 5,567,403 A | 10/1996 | Kimura et al. | |
| 5,580,490 A | 12/1996 | Collin et al. | |
| 5,746,944 A | 5/1998 | Braconnier | |
| 5,759,213 A * | 6/1998 | Adair et al. | ................. 23/305 A |
| 5,951,958 A | 9/1999 | Kimura | |
| 6,419,852 B1 | 7/2002 | Braconnier et al. | |

FOREIGN PATENT DOCUMENTS

| | | |
|---|---|---|
| DE | 2004058922 | 7/2005 |
| EP | 1108772 | 6/2001 |
| EP | 1676900 | 7/2005 |

* cited by examiner

*Primary Examiner* — Basia Ridley
*Assistant Examiner* — Heng Chan
(74) *Attorney, Agent, or Firm* — Philip C. Mendes da Costa; Bereskin & Parr LLP/S.E.N.C.R.L., s.r.l.

(57) ABSTRACT

A method for the synthesis of rare earth containing phosphates of the $LaPO_4$:Ce,Tb type comprising providing an initial charge of phosphate having a pH above 2 to a reactor; subsequently commencing introduction of a rare earth solution to the reactor, and subsequently, continuing to introduce both the phosphate and the rare earth solution to the reactor to form a mixture; whereby a rare earth phosphate precipitate is produced, at least a portion of which is precipitated while the pH of the mixture is less than 2.

26 Claims, 2 Drawing Sheets

METHOD FOR THE PRODUCTION OF RARE EARTH CONTAINING PHOSPHATES

FIELD OF THE INVENTION

The invention relates to rare-earth containing phosphates of the $LaPO_4$:Ce,Tb type that are useful for the production of phosphor material. In a particularly preferred embodiment, the invention relates to a method of preparing cerium, lanthanum and terbium mixed phosphates.

BACKGROUND OF THE INVENTION $LaPO_4$:Ce,Tb based green phosphor material synthesis has been described on several occasions in the prior art. Synthesis methods range from high temperature treatment of individual rare earth salts and oxides with phosphate entities, to the direct co-precipitation of the phosphate at elevated temperatures followed by precipitate firing to form the final material. Regardless of the synthesis method used, it is typically thought by those skilled in the art that the synthesized material must have minimal hard agglomeration, must be close to spherical in shape, have a narrow particle size that is less than 15 microns in its $D_{50}$ characteristic with high relative brightness in the fresh state and with minimal loss in this brightness when in use. Furthermore, it is typically believed that the $Ce^{III}/Ce^{IV}$ and $Tb^{III}/Tb^{IV}$ ratios should be maximized in the final form of the $LaPO_4$:Ce,Tb.

To achieve these characteristics, it is generally accepted that co-precipitation is the synthesis method of choice. It is thought that through co-precipitation, the material has better dispersion of the individual rare earths in the host matrix that are claimed to result in higher brightness of the phosphor.

Various methods have been disclosed in the past for forming $LaPO_4$:Ce based phosphors. Co-precipitation of $LaPO_4$:Ce based phosphor was described as early as 1963 by C. W. Struck in U.S. Pat. No. 3,104,226. In this patent, the author describes a method where a mixed rare earth aqueous salt solution that is neutralized to a pH of 5 by a base, such as $NH_4OH$, is prepared. An aqueous $(NH_4)_2HPO_4$ solution is then added during stirring to form a co-precipitate of lanthanum and cerium phosphates. The resultant precipitate is then filtered, dried and fired at 1,000° C. under a slightly reducing atmosphere to produce the final $LaPO_4$:Ce.

Ropp (U.S. Pat. No. 3,507,804) describes a co-precipitation method used to formulate a rare earth orthophosphate phosphor. A solution of rare earth solubilized in nitric acid is prepared and added over time to an orthphosphoric acid solution. It is disclosed that by keeping the precipitating rare earth slurry concentration at 0.1-6M in rare earth content, acidic, with the rare earth to phosphate molar ratio in the precursor solution between 1:1 and 1:9, and at higher temperatures, one is able to control the phosphor particle size to desired values and to minimize the potential of making large, hard gelatinous agglomerates that result in difficult to mill, inferior phosphors.

Chau et al. (U.S. Pat. No. 5,132,042) describes a non-co-precipitation method of $LaPO_4$:Ce,Tb synthesis that involves the reaction of boron phosphate with $La_2O_3$:Ce,Tb precursor. In this patent, it is stated that the boron acts as a slightly reducing agent that aids in the conversion of the $Ce^{IV}$ and $Tb^{IV}$ to their corresponding $3^+$ species. This, in turn, is reported to aid in the brightness of the finally prepared phosphor when fired at 1,150° C.-1,300° C.

Collin et al. (U.S. Pat. No. 5,340,556) describes a co-precipitation method of $LaPO_4$:Ce,Tb where the precipitate's brightness is not sensitive to the calcination atmosphere. It is stated that by controlling the precipitation pH at values $\geq 2$ and subsequent maturation treatment in the mother liquor at pH values $\geq 6$, an easily filterable non-gelatinous product is obtained. The control of the pH may be carried out by the addition of a basic compound during the mixing of the solution of the rare earth ions and of the phosphate compound. Thus, if the phosphate is added to the rare earth solution, the basic compound is added simultaneously with the phosphate to control the pH at a value above 2. Similarly, when the solution of rare earth compounds is added to a phosphate solution, the basic compound is added simultaneously to control the pH at a value which is higher than 2 and advantageously constant.

Braconnier (U.S. Pat. Nos. 5,470,503 and 5,746,944) discloses processes wherein a solution of rare earth salts is added to a solution of phosphate ions. In contrast to Collin et al, the patent states that the initial pH of the solution of phosphate ions be below 2 and that the pH of the solution is controlled to values below 2 during the precipitation process by adding a base. An object of the processes is to obtain an improved particle size distribution.

Kimura et al. (U.S. Pat. No. 5,567,403) states that it is a disadvantage to synthesize $LaPO_4$:Ce,Tb with particles that are either $\leq 1$ μm or $\geq 10$ μm. It is claimed that if the particles are too small the phosphor suffers from aging deficiencies and if the particles are too large, they are composed of agglomerates that break creating sub-micron dust that is not advantageous. Furthermore, they state that non-spherical particles present coating problems. To alleviate these potential problems, the inventors disclose a co-precipitation method where the aqueous rare earth salts are added over a limited period of time (3 seconds to 5 minutes) to aqueous phosphoric acid. In doing so, it is stated that control of pH by the addition of base is not necessary. It is also stated that the addition of base to control the precipitation pH as described by other researchers is disadvantageous, in that it has the undesirable effect of forming sub-micron particles.

Collin et al. (U.S. Pat. No. 5,580,490) discloses crystallites of $LaPO_4$:Ce,Tb in the form of "needles". In this patent, the inventors disclose that when LaCeTb oxalate is mixed with a phosphate anion source, aged in the mother liquor at elevated temperatures and then treated to 600° C. in any atmosphere, hexagonal $LaPO_4$:Ce,Tb with superior brightness is formed. Furthermore, it is stated in the patent that the order of addition of the suspension of rare earth compounds and the phosphate compound is not critical. However, it is preferred to add the phosphate compound to the suspension of rare earth compounds.

All the above synthesis methods for the production of rare earth containing phosphates are described as producing various advantages, such as improved particle size or particle size distribution and brightness that is not affected by calcination temperatures. These methods also are contradictory in that they disclose controlling the pH in different ranges and also that pH should not be controlled. It is apparent that, when considered in totality, the prior art recognizes that adding the rare earth and phosphates according to different regimes can produce rare earth phosphates having differing characteristics.

SUMMARY OF THE INVENTION

The present invention describes a novel method for the synthesis of rare earth containing phosphates of the LaPO4: Ce,Tb type useful in applications where an efficient absorption of X-ray or UV or visible radiation and/or an emission in the green region of the spectrum is desired. "Efficiency" is well defined in the current art and in general is defined as a relatively high ratio of emitted number photons to the absorbed number photons.

In accordance with the instant invention, the rate of reaction is controlled by controlling the rate of addition of the reagents. Accordingly, solutions of phosphate and rare earths may be prepared. As the concentration of the solutions are known, the amount of phosphate and rare earth that are present in the reactor are known by knowing the rate of addition of each solution to the reactor. Thus, the rate of reaction may be controlled by adjusting the rate of addition of the phosphate solution and/or the rate of addition of the rare earth solution to the reactor. It will be appreciated that each solution may be added in alternating aliquots or, preferably, concurrently. This provides a simplified control mechanism for the process while producing precipitates that have good properties as phosphors.

Thus, the invention relates to a method of preparing a rare earth compound, comprising combining a rare earth solution and a phosphate solution at a controlled rate to form a rare earth phosphate precipitate. The rare earth solution and the aqueous phosphate solution are preferably added continuously to the reactor. More preferably, the rare earth solution and the aqueous phosphate solution are each added at a generally constant rate to the reactor.

Therefore, in accordance with one aspect of the instant invention, there is provided a method of preparing a rare earth phosphate, comprising:
(a) introducing an initial charge of phosphate to a reactor, the initial charge having a volume;
(b) after the initial charge has been introduced to the reactor, commencing introduction of a rare earth solution to the reactor; and,
(c) subsequently, continuing to introduce both the phosphate and the rare earth solution to the reactor
whereby a rare earth phosphate precipitate is produced.

Accordingly, the method comprises providing an initial charge of phosphate to the reactor, such as by the addition of an aliquot of the phosphate solution to an initial charge of water to the reactor. Accordingly, at the commencement of the introduction of the rare earth solution to the reactor the initial charge of the reactor has a pH above 2. The initial pH of the liquid in the reactor prior to the addition of the rare earth solution to the reactor may be from 1 to 8.5 and preferably about 7.5.

In one embodiment, prior to the introduction of the rare earth solution, the reactor contains an initial volume of a phosphate solution.

In another embodiment, the phosphate solution is prepared by combining phosphate and a procuring solution.

In another embodiment, the method further comprises providing the reactor with an initial volume of a procuring solution and adding the phosphate to the reactor.

In another embodiment, the procuring solution comprises water and preferably deionized water.

In another embodiment, the method further comprises providing seed particles of the rare earth phosphate in the reactor.

In another embodiment, the phosphate is added as an aqueous phosphate solution.

The rare earth solution optionally comprises an aqueous rare earth salt. The aqueous rare earth salt typically comprises $(La_xCe_yTb_z)Cl_3$ or a mixture of lanthanum chloride salt, cerium chloride salt and terbium chloride salt. The concentration of the aqueous rare earth salt is preferably in the range 0.2-1.2M and more preferably between 0.3-0.6M. The pH of the rare earth solution is preferably between 1 and 1.5. The temperature of the rare earth solution is preferably between 10° C.-90° C. and more preferably between 45° C.-85° C.

The phosphate solution preferably comprises an aqueous phosphate salt such as $H_3PO_4$ or $(NH_4)_2HPO_4$. The concentration of phosphate solution is preferably in the range 0.3-1.8M. The aqueous phosphate salt is more preferably 0.35-0.45M $H_3PO_4$ or 0.6-0.9 M $(NH_4)_2HPO_4$. The pH of the phosphate solution range is preferably between 7.5 and 8.5 inclusive. The temperature of the phosphate solution is preferably between 10° C.-90° C., and more preferably between 45° C.-85° C.

DESCRIPTION OF THE DRAWINGS

For a better understanding of the present invention and to show more clearly how it may be carried into effect, reference will now be made by way of example to the accompanying drawings of embodiments of the present invention, in which.

DETAILED DESCRIPTION OF THE INVENTION

Figure 1:
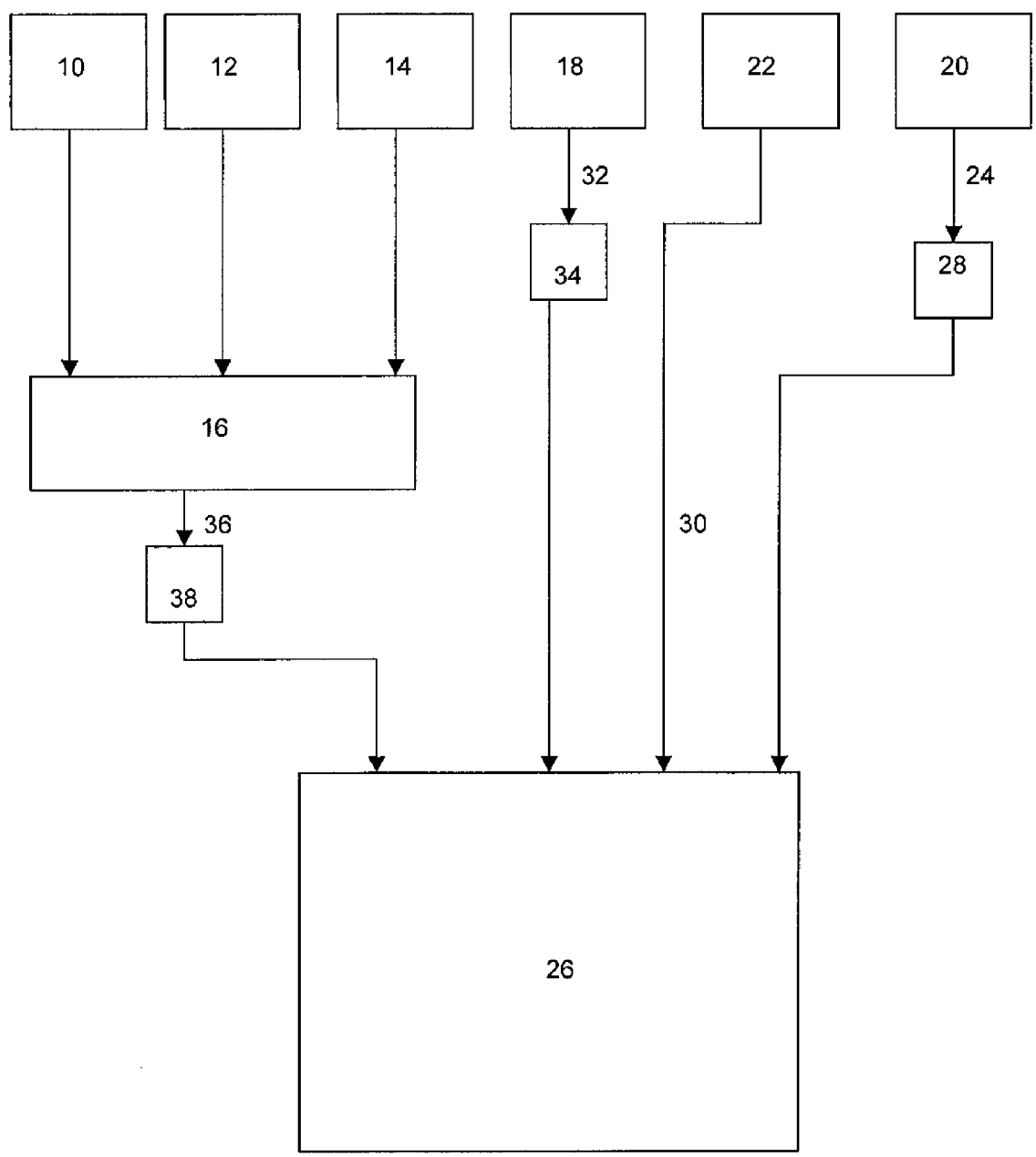
FIG. 1 is a schematic of an apparatus that may be used according to the instant invention; and, FIG. 2 is a chart exemplifying the pH profile of the reaction solution during the precipitation step.

In accordance with the invention, there is provided a novel method for the preparation of rare earth phosphates. The method is less stringent in its synthesis conditions. Further, the particle size distributions that are obtained may be multidisperse, for example, trimodal or bimodal. The present invention also shows that it is not necessary to maximize the $Ce^{III}/Ce^{IV}$ and $Tb^{III}/Tb^{IV}$ ratios in the final form of the $LaPO_4$: Ce,Tb. For example, based on the total amount of cerium in the final product, the $Ce^{(IV)}$ content may be at least: 1%, 5%, 20% or 50%% in the $Ce^{III}/Ce^{IV}$ ratio. As well, based on the total amount of terbium in the final product, the $Tb^{(IV)}$ content may be at least; 1%, 5%, 20% or 50% in the $Tb^{III}/Tb^{IV}$ ratio.

In accordance with the invention, the rate of reaction of the phosphate and the rare earth is controlled by adding the phosphate and the rare earth to a reactor over a period of time, and by controlling the rate of addition of the phosphate and the rare earth.

The reactor may be a batch reactor or a continuous flow reactor. Preferably, the reactor is a batch reactor such as a stirred tank reactor. If the reactor is a batch reactor, then the reactor is preferably sized so as to hold the total volume of a procuring solution and the reagents that are combined with the procuring solution to form a rare earth phosphate precipitate. The procuring solution is the initial charge of the reactor to which the phosphate and the rare earths are added over a period of time and permits the phosphate and the rare earths ions to combine to form a rare earth phosphate precipitate.

The reactor is provided with an initial charge of phosphate prior to the addition of the rare earth to the reactor. The initial charge comprises an amount of phosphate and a liquid carrier. The concentration of a phosphate source that may be combined with the liquid carrier to provide the initial charge may be 0.5 to 20 molar. A charge with significantly lower or higher phosphate concentration may result in phosphors with decreased performance.

The liquid carrier must be capable of solubilizing, or having suspended therein, the rare earth and phosphate ions. The liquid carrier may be water and is preferably deionized water.

The initial charge provided to the reactor may be prepared by adding the liquid carrier to the reactor and then adding the initial charge of the phosphate thereto. In such an embodiment, the procuring solution is the liquid carrier itself. The phosphate may be added in a single addition or over a period of time (e.g. 10 to 60 seconds). Accordingly, the phosphate concentration of the initial volume of fluid in the reactor (i.e. prior to the addition of the rare earth but after dilution of the phosphate source by the liquid carrier) may be 0.001M to 0.04M, preferably 0.001M to 0.02M and more preferably 0.004M to 0.01M. Alternately, the initial charge may be prepared by preparing and then adding such a dilute solution of phosphate to the reactor. In such an embodiment, the procuring solution is the dilute solution of phosphate. In either embodiment, the volume of the initial charge may be 10-50% of the volume of the reactor.

Accordingly, in one embodiment, the reactor is provided with an initial charge of a procuring solution, which consists of the liquid carrier. In such an embodiment, the procuring solution does not contain any phosphate or rare earth elements. Alternately, the procuring solution may contain the initial charge of phosphate that is provided to the reactor prior to the addition of the rare earth solution.

The temperature of the procuring solution may be between 20° C. to 90° C., preferably 40° C. and 90° C., more preferably 45° C.-85° C. and most preferably 60° C. to 80° C.

Optionally, seed particles of a rare earth phosphate, and preferably the rare earth phosphate that is to be produced, may be provided in the procuring solution. For example, the procuring solution may have provided therein a small portion of rare earth phosphate precipitate that was formed in an earlier batch or operational run. The amount of seed material may be from 0.5 to 3 wt %, preferably about 1 wt %, of the expected yield of the process. The purpose of the seed material is to form precipitates with better morphologies. Furthermore, it is preferable that the particle size of the seed should be consistent with, i.e. similar to, the particle size required of the product.

In a particularly preferred embodiment, the process uses only a single concentration of phosphate solution. Accordingly, the procuring solution does not contain any phosphate (e.g. it preferably consists essentially of water). The initial charge or initial volume of the procuring solution is provided to the reactor. Subsequently, a sufficient amount of the phosphate solution is introduced to the reactor to obtain a desired concentration of phosphate solution in the reactor. After this amount of the phosphate solution has been introduced to the reactor, a rare earth solution and additional amount of the phosphate solution are then introduced to the reactor over a period of time (e.g. they may be continuously metered into the procuring solution). Accordingly both the phosphate and the rare earth solution are added over a period of time to the reactor. However, the rare earth solution is added only after some phosphate is in the reactor.

The phosphate is preferably added as an aqueous solution. The phosphate solution may be any solution known in the art that is used to produce rare earth phosphate phosphors and may be formed by any method known in the art. Preferably, the phosphate is a phosphate salt of the formula $XHPO_4$ wherein X is selected from the group consisting of $H_2$, $(NH_4)_2$, $(NH_4)H$, and mixtures thereof. More preferably, the aqueous phosphate solution comprises at least one of $H_3PO_4$ and $(NH_4)_2HPO_4$ and, most preferably, it consists essentially of $(NH_4)_2HPO_4$.

The concentration of the aqueous phosphate solution may be between 0.3-1.8M and, preferably 0.6 to 0.9M. For example, the concentration of the aqueous phosphate solution may be 0.35-0.45M $H_3PO_4$ or 0.6-0.9 M $(NH_4)_2HPO_4$. The pH of the aqueous phosphate solution may be between 7.5 and 8.5. The temperature of the aqueous phosphate solution may be between 10° C.-90° C., preferably 40° C. and 90° C. and, more preferably, between 45° C. to 85° C.

The rare earth solution may be any solution known in the art that is used to produce rare earth phosphate phosphors and may be formed by any method known in the art. Preferably, the rare earth is an aqueous rare earth salt solution. The rare earth solution may comprise an aqueous solution of a salt of at least one rare earth. Preferably, the aqueous rare earth salt comprises a chloride, nitrate or acetate salt of at least one of lanthanum, cerium and terbium. More preferably, the rare earth salt is a combination or more than one rare earth and most preferably is a combination of lanthanum, cerium and terbium. In a particularly preferred embodiment, the aqueous rare earth salt comprises $(La_xCe_yTb_z)Cl_3$ wherein x is=0.2~0.8, y=0.1~0.7, and z=0.05~0.5. For example an aqueous solution of $(La_xCe_yTb_z)Cl_3$, $(La_xCe_yTb_z)(NO_3)_3$ or $(La_xCe_yTb_z)Ac_3$ may be prepared by adding the appropriate amounts of each rare earth chloride or nitrate or acetate respectively to achieve the desired molecular ratios x/y/z.

The total rare earth concentration in the solution may be adjusted from 0.2M to 1.2M, preferably 0.3 to 0.6 M, more preferably 0.45M to 0.55M and most preferably 0.45M to 0.5M. The pH of the solution may be adjusted to a value between 0.1 and 1. The temperature of the aqueous rare earth salt solution may be between 10° C. and 90° C., preferably 40° C. and 90° C. and, more preferably, between 45° C. to 85° C.

The rare earth solution and the phosphate solution are preferably gradually added to the reactor. The rare earth solution and the phosphate solution may be added concurrently or sequentially provided that the molar ratio of phosphate to rare earth in the reactor is preferably maintained within the range 1.1 to 3, preferably 1.2 to 1.6 and more preferably 1.3 to 1.5. Accordingly, alternate aliquots of the phosphate solution and the rare earth solution may be added to the reactor.

Preferably, the rare earth solution and the phosphate solution are concurrently added to the reactor. The addition rate of each solution to the reactor may be from 3 liters/minute to 15 liters per minute and preferably from 5 liters per minute to 10 liters per minute. Although it is understood that the rate of addition may change according to the reactor vessel size, the rate of addition is preferably controlled such that the rare earth solution and the aqueous phosphate solution are added to the procuring solution in a molar ratio of phosphate to rare earth of 1-3, more preferably 1.3-2 and most preferably 1.3 to 1.8 Accordingly, each of the rare earth solution and the aqueous phosphate solution may be added to the reactor at a rate of between 0.1 and 5% based on the volume of the solution added per minute to the volume of the initial charge in the reactor. Regardless of the reaction kinetics, by limiting the amount of the phosphate and the rare earth salt in the reactor, the rate of reaction may be controlled.

As the phosphate and rare earth solutions are added to the reactor, a rare earth phosphate precipitate will form. The precipitate may be recovered and subsequently processed by any means known in the art.

A preferred embodiment is exemplified in FIG. 1. As shown therein, the processing solution comprises deionized water. The phosphate is provided as a 0.8 molar aqueous solution of $(NH_4)_2HPO_4$ and the rare earth is provided as a 0.5 molar aqueous solution of $(La_xCe_yTb_z)Cl_3$. Separate solutions of $LaCl_3$, $CeCl_3$ and $TbCl_3$ may be provided in storage tanks 10, 12 and 14. As is known in the art, the $LaCl_3$, $CeCl_3$ and $TbCl_3$ may be combined to produce $(La_xCe_yTb_z)Cl_3$, which is stored in storage tank 16. The phosphate solution is provided in storage tank 18, the procuring solution (deionized water) is provided in storage tank 20 and seed crystals are provided in storage tank 22. The temperature of each of the solutions may be 20° C.-90° C., preferably 45° C.-85° C. and more preferably 60° C.-80° C.

In an initial step, the deionized water is provided via flow stream 24 to stirred tank reactor 26 by, e.g., pump 28. In this example, tank 26 is sized to receive a total charge of 1.5 m$^3$ and the initial charge of deionized water is 500 l. Seed crystals are added to reactor 26 via line 30 and the stirring of the reactor is commenced. It will be appreciated that the seed crystals may be added in an alternate sequence in the process, such as first adding the seed crystals followed by the addition of water. Subsequently, the phosphate solution is metered (e.g. 6-8 l/min) via flow stream 32 to stirred tank reactor 26 by, e.g., pump 34. After a desired amount of phosphate has been added to reactor 26 (e.g. after 5 to 80 seconds of adding the phosphate solution to reactor 26), the $(La_xCe_yTb_z)Cl_3$ is metered (e.g. 6-8 l/min) via flow stream 36 to stirred tank reactor 26 by, e.g., pump 38. At this time, the phosphate solution is still being added to reactor 26. Accordingly, once the initial charge of phosphate is provided to reactor 26, both the phosphate solution and the rare earth solution are simultaneously added to reactor 26. The phosphate solution and the rare earth solution may be simultaneously added to reactor 26 until the desired amount of phosphate and rare earth are added to reactor 26, which in this example is a total charge of 1.5 m$^3$. This may take 50 to 80 minutes. Precipitation follows the concurrent addition of the two solutions to reactor 26 containing the procuring solution (e.g., water).

At the end of the addition, stirring of reactor 26 may be terminated and the rare earth phosphate crystals allowed to precipitate and grow. The maturation step may be 1 to 3 hours.

Figure 2:
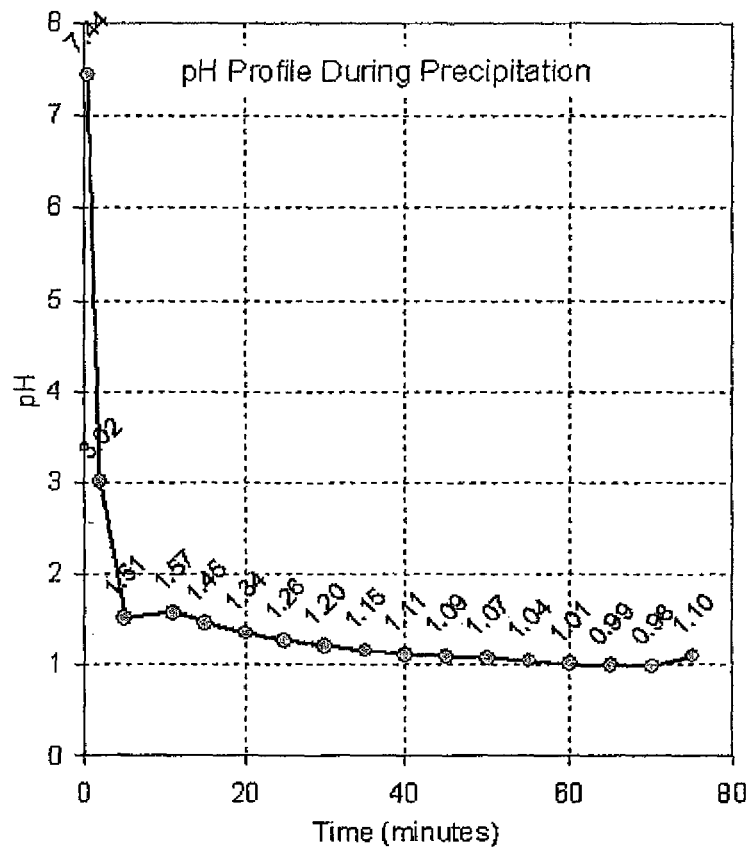

During the addition of the phosphate and the rare earth solutions and the maturation step, the temperature of the liquid in the reactor may be maintained at 20° C.-90° C., preferably 50° C.-85° C. and more preferably 60° C.-80° C. The pH may be monitored if desired but need not be used to control the process. An exemplary pH versus time curve is shown in FIG. 2.

A wetcake is obtained from the co-precipitation of an aqueous solution of rare earths and a separate phosphate solution. Following the precipitation and optional maturation step, the solids are washed and separated from the mother liquor by standard precipitation techniques.

The wetcake may then be fired at 600° C. to 1,000° C., preferably from 700° C. to 900° C. and more preferably about 800° C. for about 2 hours with or without an intermediate drying step.

All publications, patents and patent applications are herein incorporated by reference in their entirety to the same extent as if each individual publication, patent or patent application was specifically and individually indicated to be incorporated by reference in its entirety.

While the above description constitutes the preferred embodiments, it will be appreciated that the present invention is susceptible to modification and change without departing from the fair meaning of the accompanying claims.

The invention claimed is:

1. A method of preparing a rare earth phosphate, comprising:
   a. introducing to a reactor:
      i. an initial charge of phosphate, the initial charge having a volume and a pH between 7.5 and 8.5; and
      ii. seed particles of a rare earth phosphate, wherein the seed particles comprise $LaPO_4$:Ce,Tb;
   b. after the initial charge and seed particles have been introduced to the reactor, commencing introduction of a rare earth solution to the reactor; and,
   c. subsequently, continuing to introduce both the phosphate and the rare earth solution to the reactor to form a mixture;

whereby a rare earth phosphate precipitate is precipitated on the seed particles over a range of pH values between the pH of the initial charge and less than 2.

2. The method of claim 1 wherein the phosphate solution is prepared by combining phosphate and a procuring solution.

3. The method of claim 2 further comprising providing the reactor with an initial volume of a procuring solution and adding the phosphate to the reactor.

4. The method of claim 2 wherein the procuring solution comprises water.

5. The method of claim 2 wherein the procuring solution comprises deionized water.

6. The method of claim 1 wherein the phosphate solution has a temperature between 10° C. and 90° C.

7. The method of claim 6 wherein the temperature of the phosphate solution is between 45° C. and 85° C.

8. The method of claim 2 wherein the phosphate is added as an aqueous phosphate solution.

9. The method of claim 8 wherein the phosphate is a phosphate salt of the formula $XHPO_4$ wherein X is selected from the group consisting of $H_2$, $(NH_4)_2$, $(NH_4)H$ and mixtures thereof.

10. The method of claim 9 wherein the aqueous phosphate solution comprises at least one of $H_3PO_4$ and $(NH_4)_2HPO_4$.

11. The method of claim 9 wherein the aqueous phosphate solution has a concentration of phosphate that is between 0.3-1.8M.

12. The method of claim 8 wherein the aqueous phosphate solution comprises 0.6 to 0.9 M $(NH_4)_2HPO_4$.

13. The method of claim 8 wherein the aqueous phosphate solution has a temperature between 10° C. and 90° C.

14. The method of claim 13 wherein the temperature of the aqueous phosphate solution is between 45° C. to 85° C.

15. The method of claim 8 further comprising adding a volume of each of the rare earth solution and the aqueous phosphate solution into the reactor at a rate of between 0.1 and 5% based on the volume of the solution added per minute to the volume of the initial charge in the reactor.

16. The method of claim 1 wherein the rare earth solution comprises an aqueous solution of a salt of at least one rare earth.

17. The method of claim 16 wherein the salt comprises a chloride, nitrate or acetate salt of at least one of lanthanum, cerium and terbium.

18. The method of claim 17 wherein the salt comprises $(La_xCe_yTb_z)Cl_3$ wherein x is=0.2~0.8, y=0.1~0.7, and z=0.05~0.5.

19. The method of claim 16 wherein the rare earth solution has a concentration of between 0.2-1.2M.

20. The method of claim 19 wherein the concentration of the rare earth solution is between 0.3 and 0.6M.

21. The method of claim 16 wherein the rare earth solution has a temperature between 10° C. and 90° C.

22. The method of claim 21 wherein the temperature of the rare earth solution is between 45° C. and 85° C.

23. The method of claim 8 wherein, in step (c), the rare earth solution and the aqueous phosphate solution are added continuously to the reactor.

24. The method of claim 23 wherein, in step (c), the rare earth solution and the aqueous phosphate solution are added at a generally constant rate to the reactor.

25. The method of claim 8 wherein, in step (c), the rare earth solution and the aqueous phosphate solution are combined with the procuring solution in a molar ratio of phosphate to rare earth of 1.3-1.8.

26. The method of claim 1, wherein the rare earth phosphate precipitate is continuously precipitated on the seed particles over the range of pH values.

* * * * *